(12) United States Patent
Goldenberg et al.

(10) Patent No.: US 11,781,929 B2
(45) Date of Patent: Oct. 10, 2023

(54) PRESSURE SENSOR DIAPHRAGM FOR POOL CLEANING ROBOT

(71) Applicant: Maytronics Ltd., Kibutz Yizrael (IL)

(72) Inventors: Gilad Goldenberg, Kfar saba (IL); Avshalom Kehati, Zikhron Yaakov (IL)

(73) Assignee: MAYTRONICS LTD., Kibbutz Yizrael (IL)

( * ) Notice: Subject to any disclaimer, the term of this patent is extended or adjusted under 35 U.S.C. 154(b) by 343 days.

(21) Appl. No.: 17/247,906

(22) Filed: Dec. 29, 2020

(65) Prior Publication Data

US 2021/0199525 A1 Jul. 1, 2021

Related U.S. Application Data

(60) Provisional application No. 62/954,897, filed on Dec. 30, 2019.

(51) Int. Cl.
*E04H 4/16* (2006.01)
*G01L 9/00* (2006.01)
*G05D 1/02* (2020.01)

(52) U.S. Cl.
CPC .......... *G01L 9/0044* (2013.01); *E04H 4/1654* (2013.01); *G05D 1/0206* (2013.01); *E04H 4/16* (2013.01); *G05D 2201/0203* (2013.01)

(58) Field of Classification Search
CPC ........ E04H 4/16; E04H 4/1636; E04H 4/1654
See application file for complete search history.

(56) References Cited

U.S. PATENT DOCUMENTS

| | | | |
|---|---|---|---|
| 2018/0066444 A1* | 3/2018 | van der Meijden | .. E04H 4/1663 |
| 2019/0040642 A1* | 2/2019 | Michelon | .............. E04H 4/1654 |
| 2019/0203490 A1* | 7/2019 | Borg | ...................... E04H 4/1654 |
| 2021/0079679 A1* | 3/2021 | Hui | ............................ E04H 4/16 |

* cited by examiner

*Primary Examiner* — Michael D Jennings
(74) *Attorney, Agent, or Firm* — Reches Patents

(57) ABSTRACT

A pool cleaning robot that may include a hollow body, a fluid input, a fluid output, a propulsion unit for moving the pool cleaning robot within a pool, a filtering unit, and a sensing module that comprises a gas pressure sensor, a first space, a second space and a diaphragm; wherein the diaphragm seals the second space and separates the first space from the second space; wherein the diaphragm, via the first space, is fluidly coupled to the filtering unit; wherein the diaphragm is configured to define a gas pressure within the second space as a function of, at least, a fluid pressure within the first space; wherein the gas pressure sensor is located within the second space and is configured to measure the gas pressure within the second space.

21 Claims, 8 Drawing Sheets

PRESSURE SENSOR DIAPHRAGM FOR POOL CLEANING ROBOT

CROSS REFERENCE

This application claims priority from U.S. provisional patent 62/954,897 filing date Dec. 30, 2019, which is incorporated herein by reference.

BACKGROUND

It is well known that electrical pool cleaning robots are usually being immersed into a swimming pool and their operation initiated. After that, the main operations of the pool cleaning robot are initiated.

The main said operations involve travelling movements and scanning of the swimming pool surfaces that are governed by various navigation options.

While travelling and scanning the pool, the pool cleaning robot usually sweeps and brushes the said surfaces so that it may vacuum the dirt and debris into the pool cleaning housing that contains a filtering unit or filtering element.

The vacuuming function entails suction of pool fluid through an inlet, filtering the fluid, holding the dirt in the said filtering unit and outputting the filtered fluid back into the pool via the outlet.

Accumulated dirt in the filtering unit may eventually clog the filter and so reducing the cleaning efficiency of the pool cleaning robot. End users may not be always fully aware that the filters are clogged and need to be replaced or manually cleaned or washed.

There is a constant need to provide improved solutions to better control the level of cleanliness of the filtering unit so that human intervention is performed in an efficient and effective manner.

An effective and efficient way to measure dirt accumulation is by measuring the changes of the accumulated pressures that a generated inside a pool cleaning robot housing.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
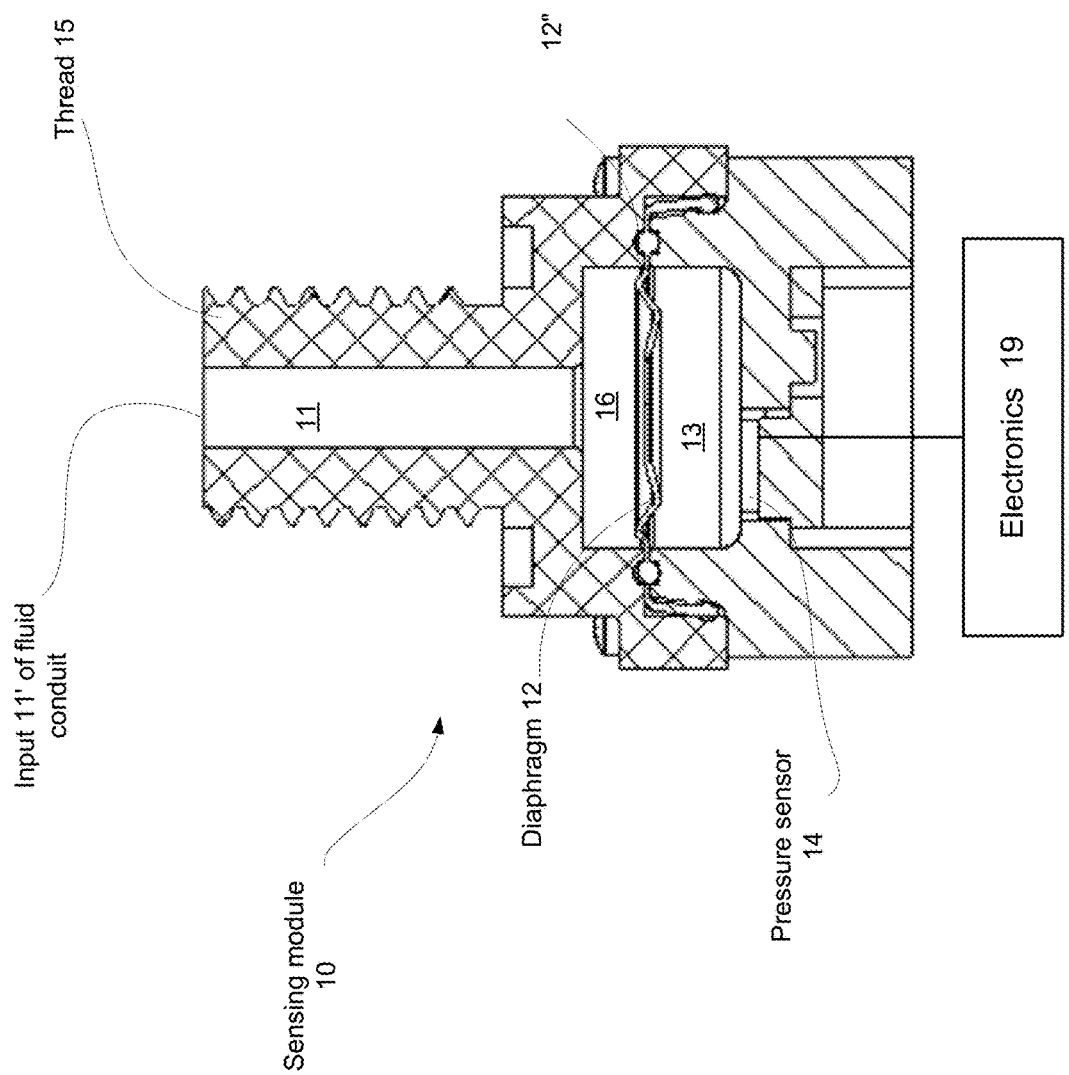
FIG. 1 illustrates an example of a cross section of a sensing module.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF THE PREFERRED EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to a system (such as a pool cleaning robot) should be applied mutatis mutandis to a method that can be executed by the system (such as a pool cleaning robot).

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory processor readable medium that stores instructions that once executed by a processor result in the execution of the method.

Sensors may increase in sophistication. For example, pressure sensors may be used in conjunction of embedded control algorithms Different responses to different encountering of events may be initiated by the said sensors.

Incremental events of a filtering element that is beginning to be filled up with dirt, debris and dustup to completely clogged filtering meshes may be recognized by means of a pressure sensor device.

Pre-programming of responses to meeting said events may be accomplished by software programs that are factory embedded onto microprocessors onboard the pool cleaning robot control box.

Any deterioration from a clean to a completely clogged filtering element may automatically emit a wireless, or other electrical status signal, such as a flashing light, to alert the pool owner about said conditions.

Additional programs may be made available to the end user such as transmit-receive remote control communication devices.

There is provided a pool cleaner that employs a sensing module that includes a pressure sensor and pre-programmed processor for determining the level of cleanliness of the on-board filtering element (filtering unit) and is able to transmit data from a pool cleaner to a pool cleaning robot operator. The cleanliness of the filtering element is a function that may vary or modify the internal pressure exerted on the said pressure sensor.

Figure 2:
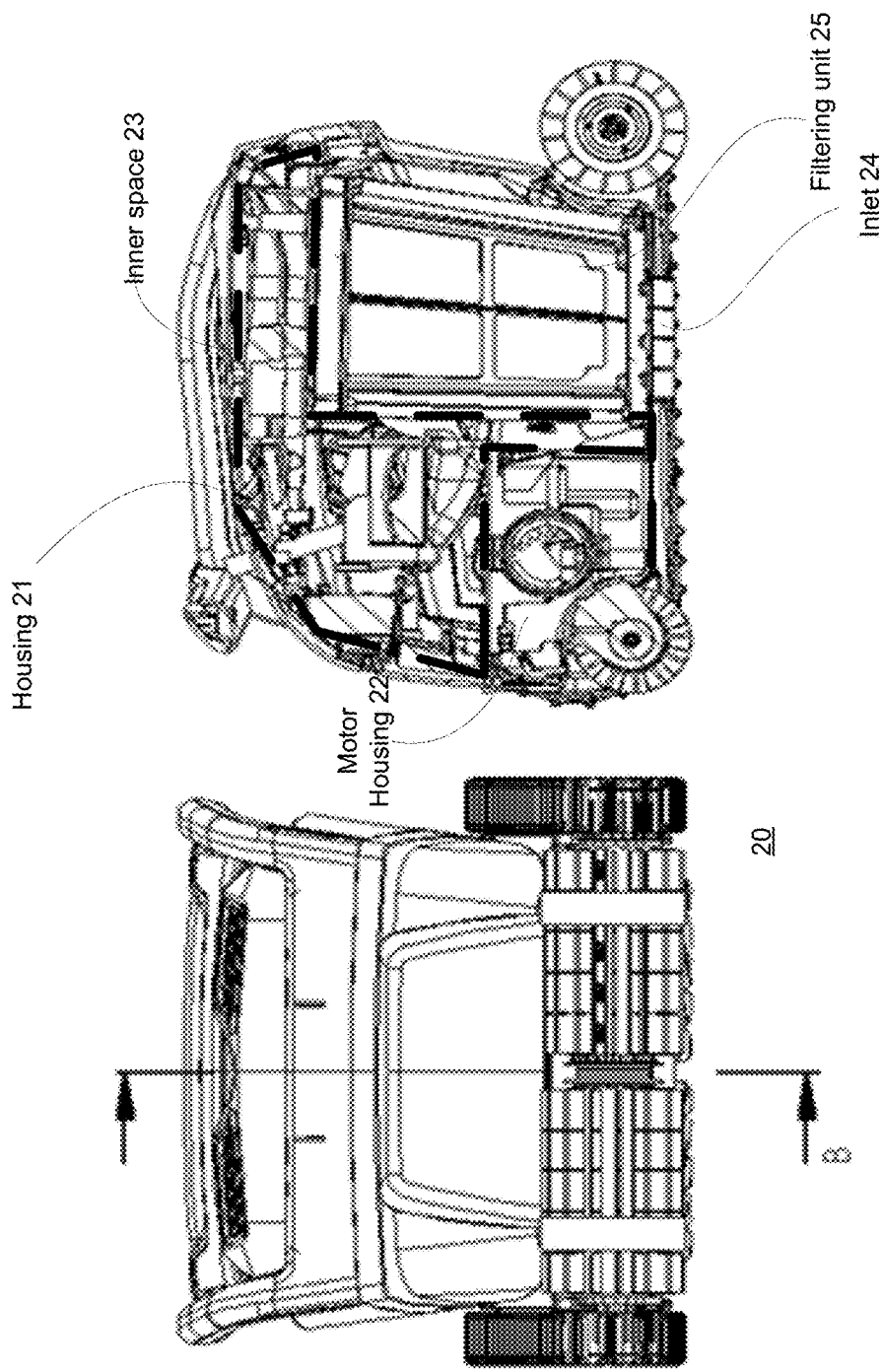
FIG. 2 illustrates an example of a pool cleaning robot.

In addition to the sensing module, the pool cleaning robot (denoted 10 in FIG. 2) may include at least some of the following elements:

a. A hollow body.
b. A fluid intake aperture.
c. A fluid outlet aperture.
d. A fluid path fluidly coupling the fluid intake aperture and the fluid output aperture.
e. A filtering and/or sieving element positioned inside the said fluid path. Such as a filtering unit (denoted 25 in FIG. 2). An inner space (denoted 23 in FIG. 2) is formed within the housing (denoted 21 in FIG. 2) of the pool cleaning robot—and does not include the filtering unit.
f. A pumping motor positioned in the fluid path.
g. A driving motor and reduction gears.
h. A control module that may include the PCB, hardware and software, such as a processor.
i. Wheels, or tracks of any other interfaces with the pool.
j. Cleaning elements such as pool surface dirt brushes or scrappers,
and/or auxiliary brushing or scrapping member.
k. Power supply components such as electrical tethered power supply cable, a chargeable battery, a wireless charging element, an electrical power supply pack.
l. A communication unit for communicating (wirelessly or in a wired manner) with a computerized control unit and/or any other communication unit.
m. One or more sensors in addition to the sensing module. For example a temperature sensor, a pump motor velocity/current sensors.

The on-board sensing module may be located at or connected to a housing of a motor unit that may be sealed and may include one or more motors and electrical components such as a Printed Circuit Board (PCB) and electronics (such as a processor) of the pool cleaning robot.

A fluid conduit of the pressure sensor system, that may be threaded, may be inserted and connected through an opening in any sidewall of the housing of the motor unit, may be secured to the said sidewall using a nut (denoted 18 in FIG. 1), so that the fluid input conduit may protrude outwardly to be in contact with the flowing fluid inside the hollow body of the pool cleaning robot.

The pressure that is being measured by the gas pressure sensor may be affected by one or more additional parameters—such as the ambient pressure—the pressure applied on the pool cleaning robot due to its location. The ambient pressure may be the atmospheric pressure when the pool cleaning robot is outside of the pool. The ambient pressure is a combination of atmospheric pressure and hydrostatic fluid pressure when the pool cleaning robot is submerged.

A pressure sensed by the gas pressure sensor may reflect the ambient pressure.

A drop in internal pressure inside the pool cleaning robot may be caused by a fluid suction increased speed due to filtering element clogging.

Figure 4:
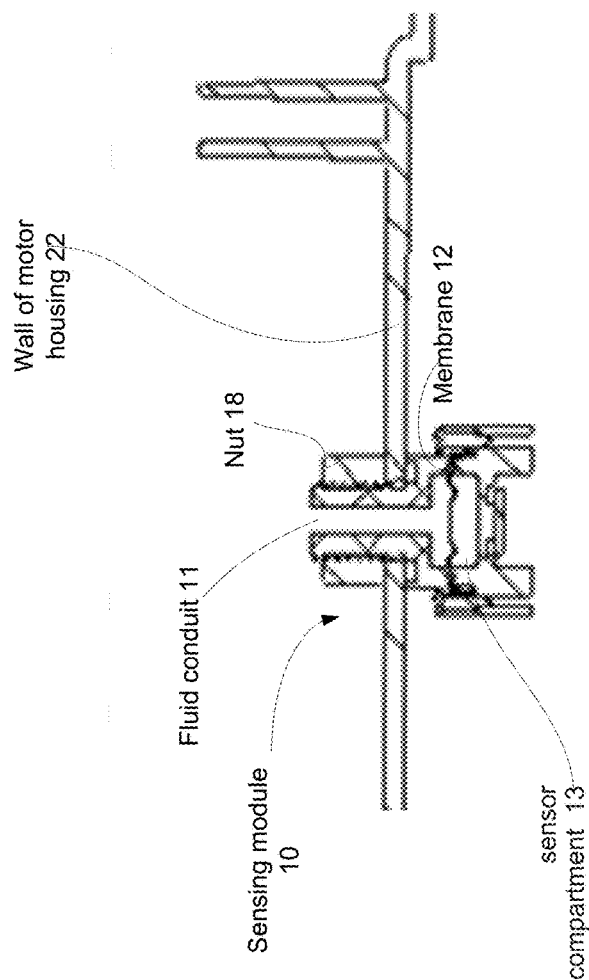
FIG. 4 illustrates an example of a cross section of a sensing module and a part of a motor housing.

A pressure decrease in the sensor compartment may be a translation of the ambient decrease of the internal pressure measured within the hollow body. Sensor compartment 13', sensing module 12, fluid conduit 11, nut 18 membrane 12 and a wall of motor housing 22 are illustrated in FIG. 4.

A decrease in internal pressure may also be caused by a fluid suction reduction due to filtering element clogging.

Any drop or increase in said internal hollow body pressures will have an effect on the pressure exerted on the diaphragm where it's movement will in turn pressurize (or depressurize) the air that is located within the sealed air-filled compartment.

The air pressure variations in the sealed air-filled compartment may pressurize (or depressurize) a gas pressure sensor 14 located within the a second space of the sensing module, the second space is sealed from fluid.

FIG. 1 illustrates the sensing module that include a first part 71 and a second part 72 that may press diaphragm 12 from opposite sides of the diaphragm. The first and second parts may be connected to each other by any mechanical means—for example by screws 74 such as but not limited to M12 screws.

A fluid conduit 11 formed in the first part 71 is surrounded by a thread 15 that may be a M12×1.75 thread that is exposed to the fluid flowing inside of the hollow body of the pool cleaning robot housing. The second space 13 may be pre-set at factory level to, for example, a 1000 mbar air pressure. Pressure change may be exerted onto the first space 16.

Figure 3:
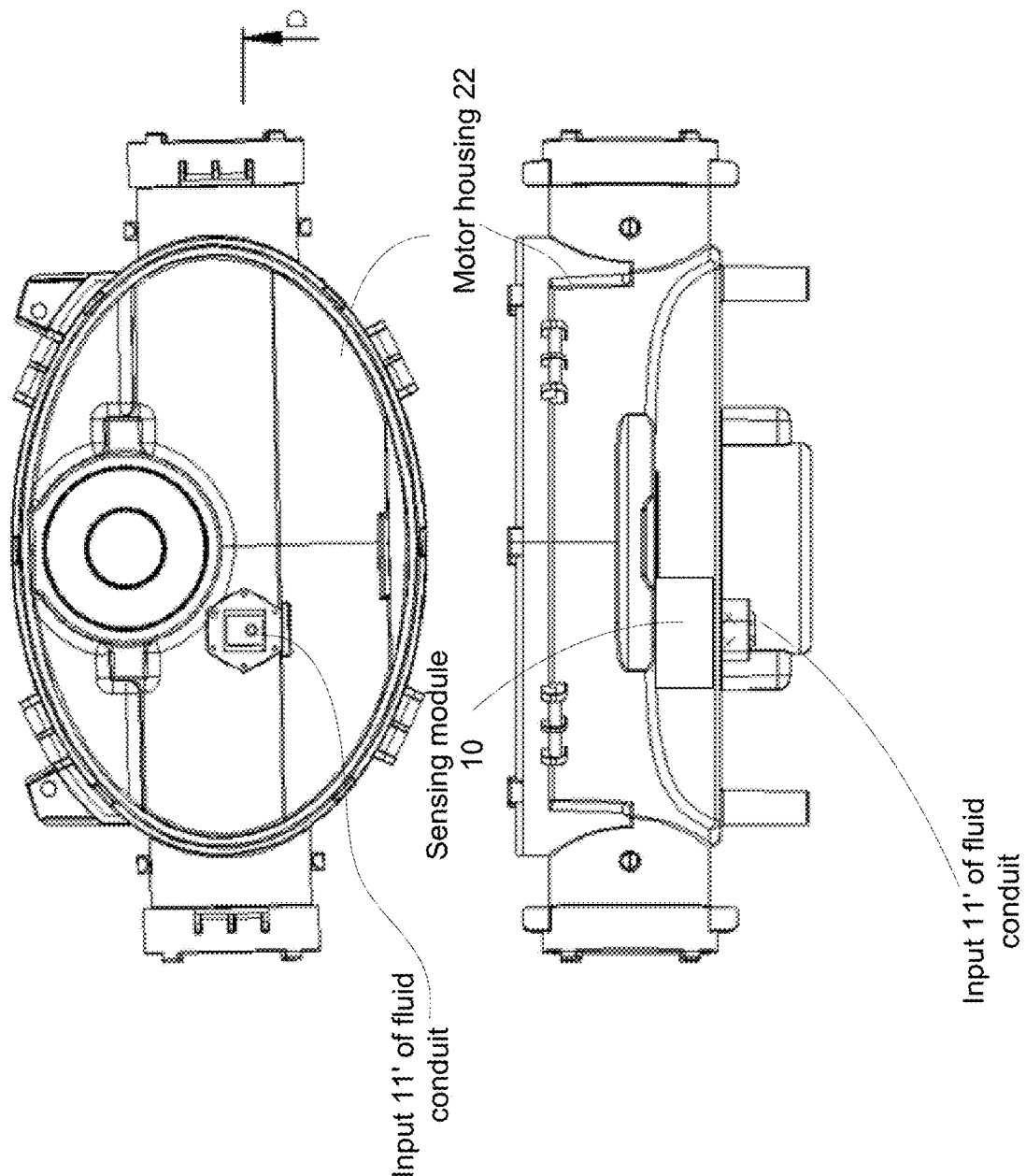
FIG. 3 illustrates an example of a motor housing.
Figure 5:
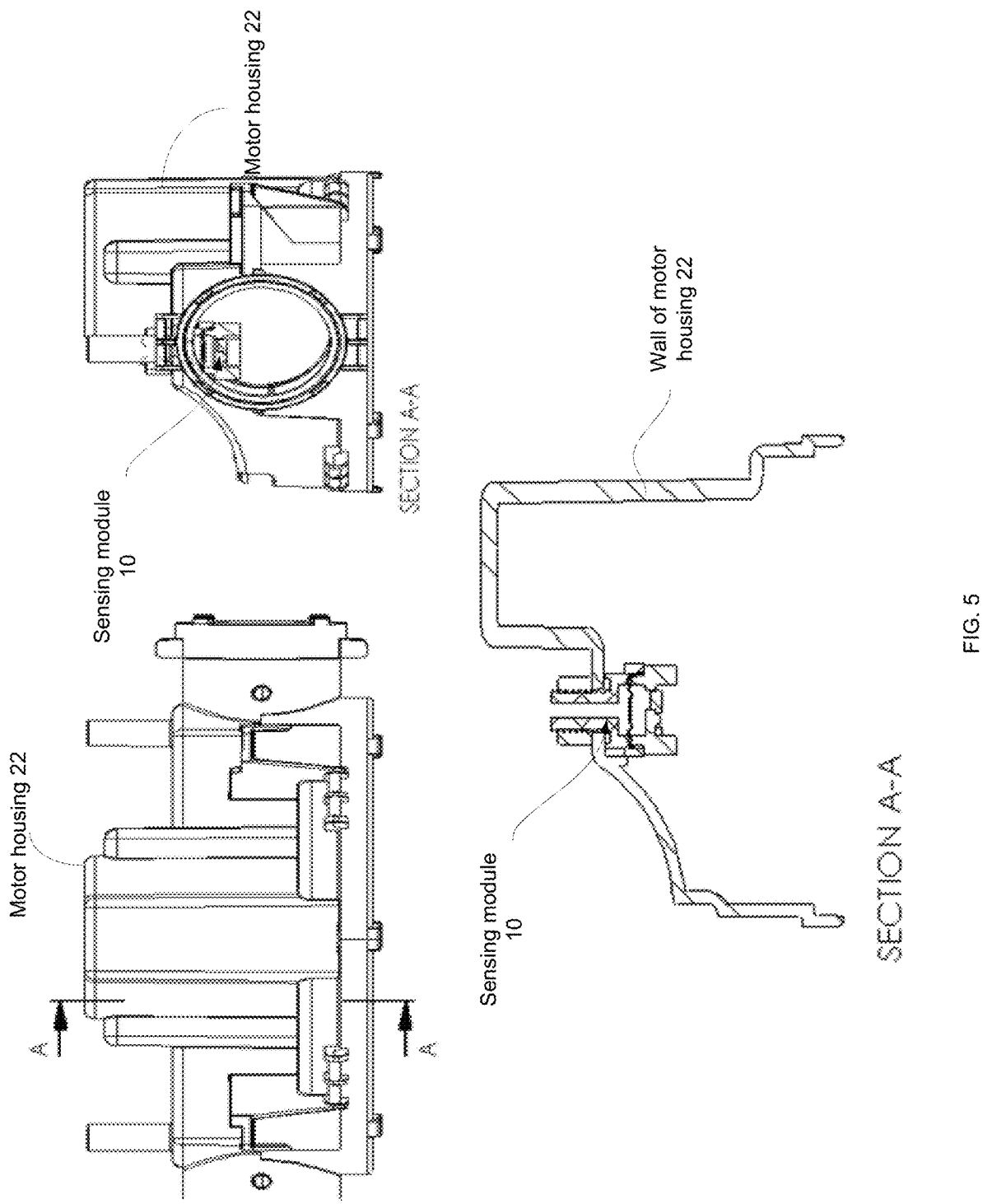
FIG. 5 illustrates an example of a sensing module and a motor housing.

For example, an increased pressure of 1010 mbar exerted on the fluid conduit 11 via the input of fluid 11' may push (or pull) the diaphragm 12 located between the first space 16 and the second space. The input of fluid 11', motor housing 22 and sensing module 10 are also illustrated in FIG. 3. The motor housing 22 and sensing module 10 are also illustrated in FIG. 5.

The diaphragm 12 may be sealed by the diaphragm pressure seal (12") that may belong to an exterior part 75 of the diaphragm and further face/axial seal (not numbered) that will in turn increase the pressure in the second space 13.

Gas pressure sensor 14 may sense the said gas pressure increase or decrease (within the second space) and transmit detection signals about the gas pressure within the second space—in any manner—for example by using a $I^2C$ communication to the main pool cleaning robot control PCB.

In addition—a fluid pressure drop may apply a pull force on the diaphragm 12 and decrease the gas pressure in the second space 13.

In order to be able to measure precise barometric pressure readings generated inside the filtering unit or hollow body (for the purpose of this specification both definitions may be analogous), a factory preset barometric pressure of, for example a nominal 1000 mbar, will be reset in situ after the pool cleaning robot is immersed inside pool fluid and sinks to the bottom. A few ambient pressure readings will then be actively measured to neutralize environmental effects of barometric levels read at, for example, sea levels versus mountain heights, calm versus high barometric pressures stormy weathers and the imperative all-important pool fluid depths varying fluid pressures.

The said varying fluid pressure variations are of a magnitude of 1 mbar for each cm (centimeter) of pool fluid depth. The resetting will normalize the real pool fluid pressure at a specific entry point that may still vary between the deep end to the shallow end of the pool.

The diaphragm 12 may have any shape and/or size. For example the diaphragm may be shaped to reduce strain. The diaphragm may be made from any material—for example can be made from ethylene propylene diene monomer rubber (EPDM). The EPDM maybe of any hardness—for example hardness of 30—for example Shore A. The hardness may differ from 30.

Figure 7:
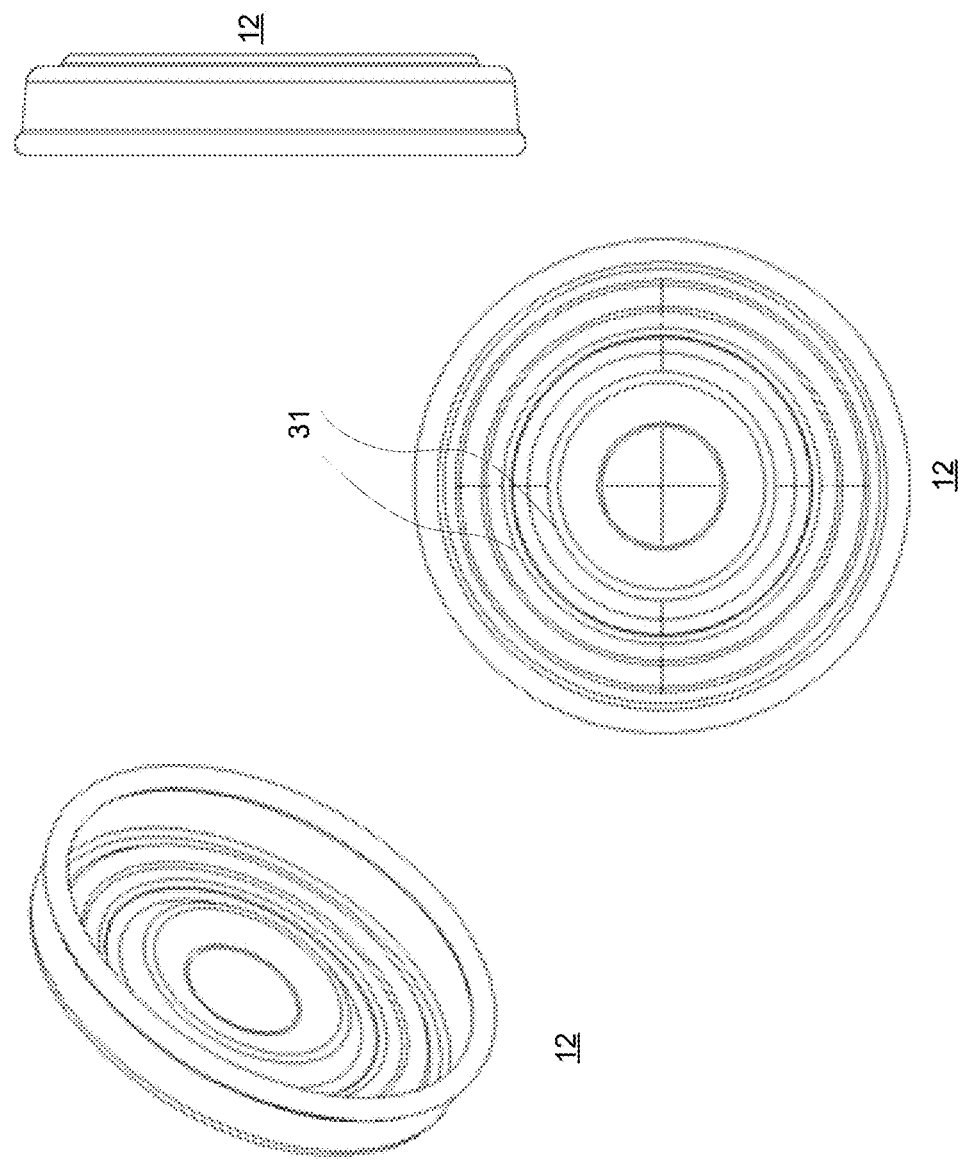
FIG. 7 illustrates an example of a diaphragm.

When applying fluid pressure (from fluid conduit 11), the diaphragm is subjected to inner material forces so it can balance the pressure between fluid conduit and first space 16 to second space area 13. These said inner forces may be significantly reduced by the wave or ripple like protuberances 31 of the diaphragm surface forming circular bellows or wrinkles that can be seen in FIG. 7.

For example—the maximum absolute pressure that first space feels may be 1600 [mbar] (5 m fluid deep+atmospheric pressure). Meaning, that if the second space is subjected to a pressure of 1000 [mbar] absolute pressure (the pressure at the OEM factory assembly line), the diaphragm presses the second space so it reduces the volume of the second space 13 to be 62.5% than its original volume.

Due to the special geometric shape of the diaphragm, the maximum elongation of the diaphragm (after applying 1600 mbar) may be about 35%.

The applicable formula is
P1 is the barometric pressure in a typical case (at ground level).
P2 is the barometric pressure in a typical case+5 m fluid depth (pool cleaning robot submerged at a depth of 5 meters below the waterline)
V1 is the volume in the second space when the sensor is exposed to barometric pressure
V2 is the volume in the second space when the sensor is exposed to barometric pressure+5 m depth.

$$\frac{P_1}{P_2} = \frac{V_2}{V_1} = \frac{1600}{1000} ==> V_2 = 0.625 V_1$$

Figure 6:
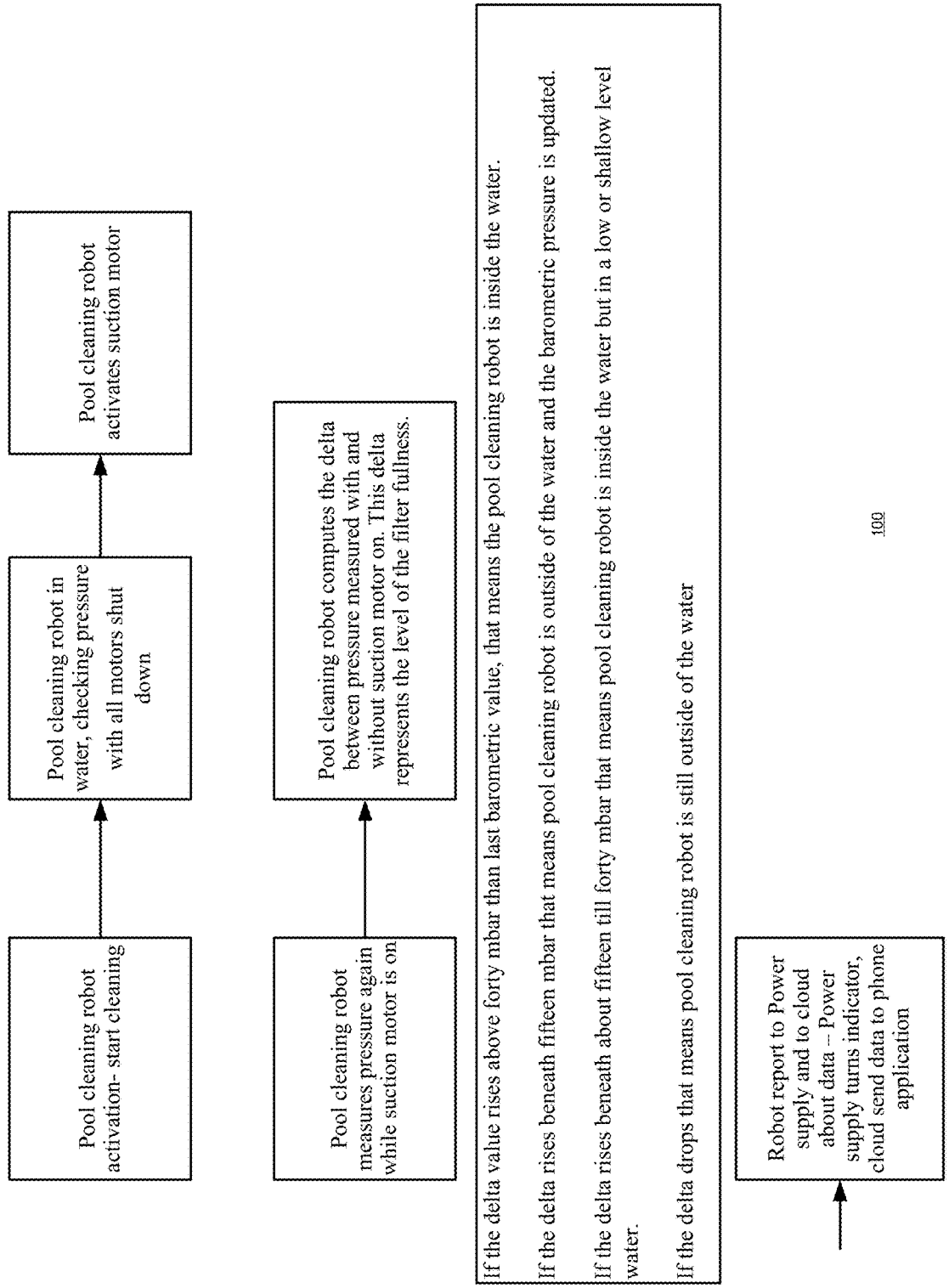
FIG. 6 illustrates an example of a method.

The above mentioned resetting process (denoted 100 in FIG. 6) entails:
(a) submerging and positioning the pool cleaning robot in a flat and calm floor surface area of the pool away from fluid drain, jets and the like.
(b) This is followed by a few seconds of gas pressure stabilization and saving that gas pressure level into its PCB control memory storage.
€ After that the pool cleaning robot activates the impeller pump motor (or any other movable element that can alter the fluid pressure- and hence change the gas pressure) followed by a few seconds of another gas pressure stabilization and saving that gas pressure level into its PCB control memory storage.
(d) The said PCB control processor may calculate the actual gas pressure by subtracting the said pump motor pressure reading (c) from €).
(e) Cleaning cycle time may commence.
(f) The ongoing gas pressure level measurements are compared to a pre-measured filtering unit fullness scale whereby, the higher (or lower) the gas pressure value means a fuller filtering unit.

Namely, the sensor of this specification may measure the ambient pressure at different pool depths.

The said measurements of pool fluid depth pressures process entail:
(a) In conjunction of end user, the pool cleaning robot measures the barometric pressure while performing a short pump motor activation outside of the pool.
(b) The pool cleaning robot is then submerged and shuts the pump motors.
(c) The pool cleaning robot measures the gas pressure value.
(d) The pool cleaning robot control processor may subtract the value of (c) from (a) with the result being the gas pressure at the point of pool cleaning robot submergence.

Pool cleaning measuring process if it is in or out of the fluid:
(a) The pool cleaning robot may measure the barometric pressure X times a day. It may read the gas pressure sensor value and update the barometric pressure if it is not in the fluid.
1. If the gas pressure rises above 40 mbar than last barometric value reading, then this may mean that the pool cleaning robot is fully submerged inside the fluid.
2. If the gas pressure value rises below 15 mbar, then that may mean that the pool cleaning robot is outside of the pool fluid and the barometric pressure may be updated.
3. If the gas pressure value rises between 15-40 mbar, then that may mean that the pool cleaning robot is inside the fluid but in a shallow level fluid pool area.
4. If the gas pressure value drops that may mean that the pool cleaning robot is still outside of the fluid.
(b) When (a)1 occurs, the pool cleaning robot main processor may be updated to validate that the robot is in fluid. As will be described below, this also enables a status information transfer to the user using phone/application/power supply/internet interface and the like.

Furthermore, additional temperature compensations are measured. Namely, ambient cold pool fluid may cause the rubber diaphragm to harden. Warm fluid may cause the rubber to soften.

Temperature compensation process entail:
The sensor diaphragm is made from a rubber-based material and its stiffness/young module/hardness can be changed as a translation of the fluid temperature that touches the rubber. This phenomenon will change the sensor sensitivity. This sensitivity will be guessed by the main pool cleaning robot microprocessor through the fluid temperature measured by the sensor itself (see "reading temperature") or another temperature sensor.

For every temperature degree change (drop or rise) the sensor will integrate in its PCB memory chip a compensation table that can be seen in the following table that depicts examples of different sensitivities based on different temperatures:

| Temperature [C.] | Sensitivity [%] |
|---|---|
| 5-15 | 70 |
| 15-25 | 80 |
| 25-35 | 95 |

A temperature sensor may be included in the second chamber 13, that may be able to transmit temperature information to the main PCB control processor and also enables a status information transfer to the user using phone/application/power supply/internet interface and the like.

Measuring robot movement, trajectories and speed in the fluid entails:
(a) The pool cleaning robot said may read the gas pressure at a point.
(b) The pool cleaning robot may read the gas pressure again a preset X time ahead and thereby calculate the ground speed level. For example—When driving in a slope, we can measure pressure in two points of the slope and compute how deep the robot is in two points, and together with the accelerometer/gyro that gives us the slope angle, we can compute how far the robot had gone on the ground. If we derive it by time, we can get the speed.

(c) Multiple readings of gas pressure may indicate whether the pool cleaning robot is moving from a high-pressure zone of the pool (the deep end) to a lower pressure zone (the shallow). This is especially important when travelling towards the fluid level in a wall climbing mode so that the pool cleaning robot may measure the distance to the waterline.

The said rubbery material type of the diaphragm may include of silicone rubber, nitrile rubber, EPDM rubber fluorocarbon and the like.

The said rubber hardness may vary between 30 to 70 shore A with a wall thickness of about 0.3 mm.

The pool cleaning robot may, as stated above, communicate wirelessly or not, with an external control device such as a portable processor or tablet or smart telephone device including a suitable IOS, Android or Windows phone operating systems with internet and/or wireless communication abilities, each including, but not exclusively, a touch LCD screen or the like.

The pool cleaning robot may include any type of propulsion system, any type of filtering unit, and the like.

Figure 8:
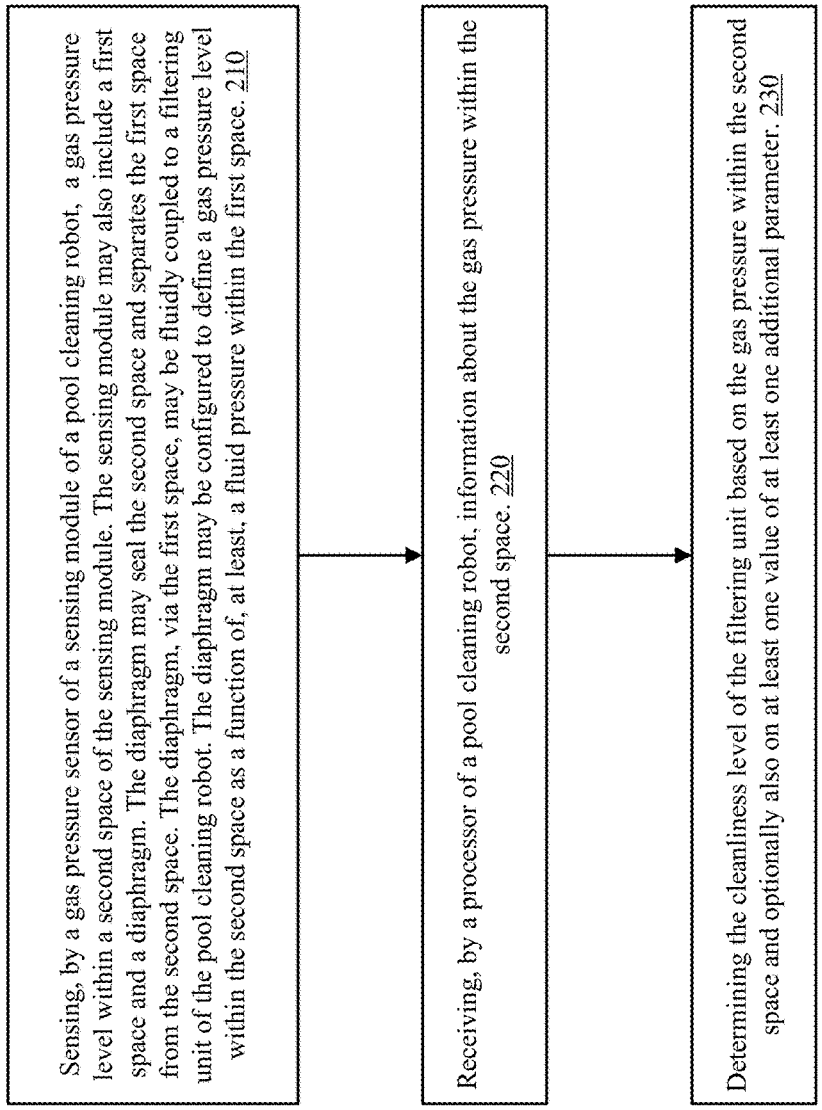
FIG. 8 illustrates an example of a method.

FIG. 8 illustrates method 200 for evaluating a cleanliness of a filter of a pool cleaning robot.

Method 200 may start by step 210 of sensing, by a gas pressure sensor of a sensing module of a pool cleaning robot, a gas pressure within a second space of the sensing module. The sensing module may also include a first space and a diaphragm. The diaphragm may seal the second space and separates the first space from the second space. The diaphragm, via the first space, may be fluidly coupled to a filtering unit of the pool cleaning robot. The diaphragm may be configured to define a gas pressure within the second space as a function of, at least, a fluid pressure within the first space.

Step 210 may be followed by step 220 of receiving, by a processor of a pool cleaning robot, information about the gas pressure within the second space.

Step 220 may be followed by step 230 of determining, by the processor, a cleanliness level of a filtering unit of the pool cleaning robot, based at least on the gas pressure within the second space.

Step 230 may include determining the cleanliness level of the filtering unit based on the gas pressure within the second space and on at least one value of at least one additional parameter.

Step 210 may be preceded by a calibration process. The calibration process may be sued for compensating for values of the one or more additional parameters such as ambient pressure, temperature, operation of the pool cleaning robot, and the like.

Any values mentioned above are non-limiting examples of values.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also, for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, microprocessors, servers, workstations, personal processors, notepads, personal digital assistants, electronic games, automotive and other embedded systems, cell phones and various other wireless devices, commonly denoted in this application as 'processor systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A pool cleaning robot comprising:
   a hollow body, a fluid input, a fluid output, a propulsion unit for moving the pool cleaning robot within a pool, a filtering unit, and a sensing module that comprises a gas pressure sensor, a first space, a second space and a diaphragm;
   wherein the diaphragm seals the second space and separates the first space from the second space;
   wherein the diaphragm, via the first space, is fluidly coupled to the filtering unit;
   wherein the diaphragm is configured to define a gas pressure within the second space as a function of, at least, a fluid pressure within the first space;
   wherein the gas pressure sensor is located within the second space and is configured to measure the gas pressure within the second space.

2. The pool cleaning robot according to claim 1 comprising a processor that is configured to receive information about the gas pressure within the second space and to determine a cleanliness level of the filtering unit based on the gas pressure within the second space.

3. The pool cleaning robot according to claim 2 comprising a communication unit that is configured to transmit, outside the pool cleaning robot at least one out of (a) information about cleanliness level of the filtering unit, and (b) the information about the gas pressure within the second space.

4. The pool cleaning robot according to claim 2 wherein the fluid pressure within the first space is affected by the cleanliness of the filtering unit and at least one additional parameter; wherein the processor is configured to receive information about at least one value of the at least one additional parameter and to determine the cleanliness level of the filtering unit based on (a) at least one value of the at least one additional parameter, and (b) the gas pressure within the second space.

5. The pool cleaning robot according to claim 4, comprising a temperature sensor configured to sense a temperature associated with the diaphragm; wherein the at least one parameter comprises the temperature associated with the diaphragm.

6. The pool cleaning robot according to claim 4 wherein the at least one parameter comprises ambient pressure applied on the pool cleaning robot.

7. The pool cleaning robot according to claim 4 wherein the at least one parameter is related to mechanical movements of at least one component of the pool cleaning robot.

8. The pool cleaning robot according to claim 4 wherein the at least one parameter is related to mode of operation of the pool cleaning robot.

9. The pool cleaning robot according to claim 1 wherein the propulsion unit comprises a motor that is positioned within a motor housing; wherein the sensing module is affixed to the motor housing.

10. The pool cleaning robot according to claim 9 wherein at least a part of the first space extends outside the motor housing.

11. The pool cleaning robot according to claim 10 wherein the at least a part of the first space extends outside a top surface of the motor housing.

12. The cleaning robot according to claim 1 wherein the diaphragm comprises stress relief elements.

13. The cleaning robot according to claim 1 wherein the sensing module comprises a first portion and a second portion; wherein an exterior part of the diaphragm is pressed between the first portion and the second portion; wherein the first portion comprises a threaded part that surrounds a first conduit; wherein the first conduit extends between an opening of the first portion and the first chamber; wherein the first portion is connected to the second parts via screws.

14. The pool cleaning robot according to claim 1 comprising one or more nuts, wherein the propulsion unit comprises a motor that is positioned within a motor housing; wherein the sensing module comprises a threaded portion, wherein the motor housing comprises an opening, wherein the threaded portion is configured to pass through the opening in the motor housing and to be fastened to the motor housing by one or more nuts.

15. The cleaning robot according to claim 1 wherein the diaphragm comprises radially symmetrical protuberances.

16. The cleaning robot according to claim 1 wherein the diaphragm is made of EPDM 30.

17. The pool cleaning robot according to claim 1 comprising a processor that is configured to perform temperature compensation and adjusting process.

18. The pool cleaning robot according to claim 1 comprising a communication unit that is configured to communicate using I$^2$C protocol.

19. The pool cleaning robot according to claim 1 comprising a communication unit that is configured to communicate with a user by a wired or wireless communication protocol.

20. A method for evaluating a cleanliness of a filter of a pool cleaning robot, the method comprises:
   sensing, by a gas pressure sensor of a sensing module of a pool cleaning robot, a gas pressure within a second space of the sensing module; wherein the sensing module further comprises a first space and a diaphragm; wherein the diaphragm seals the second space and separates the first space from the second space; wherein the diaphragm, via the first space, is fluidly coupled to a filtering unit of the pool cleaning robot;
   wherein the diaphragm is configured to define a gas pressure within the second space as a function of, at least, a fluid pressure within the first space;
   receiving, by a processor of a pool cleaning robot, information about the gas pressure within the second space; and
   determining, by the processor, a cleanliness level of a filtering unit of the pool cleaning robot, based at least on the gas pressure within the second space.

21. The method according to claim 20 comprising determining the cleanliness level of the filtering unit based on the gas pressure within the second space and on at least one value of at least one additional parameter.

* * * * *